(12) United States Patent
Mark

(10) Patent No.: US 11,588,158 B2
(45) Date of Patent: *Feb. 21, 2023

(54) ELECTROCHEMICAL CELL WITH ELECTRODE FILLED PROTRUSION

(71) Applicant: Energizer Brands, LLC, St. Louis, MO (US)

(72) Inventor: Johnson Mark, Fremont, CA (US)

(73) Assignee: Energizer Brands, LLC, St. Louis, MO (US)

(*) Notice: Subject to any disclaimer, the term of this patent is extended or adjusted under 35 U.S.C. 154(b) by 168 days.

This patent is subject to a terminal disclaimer.

(21) Appl. No.: 16/993,828

(22) Filed: Aug. 14, 2020

(65) Prior Publication Data

US 2020/0373589 A1    Nov. 26, 2020

Related U.S. Application Data

(63) Continuation of application No. 15/910,483, filed on Mar. 2, 2018, now Pat. No. 10,784,519.

(51) Int. Cl.
*H01M 6/04*     (2006.01)
*H01M 6/08*     (2006.01)
*H01M 50/56*    (2021.01)
*H01M 50/174*   (2021.01)
(Continued)

(52) U.S. Cl.
CPC ............ *H01M 6/04* (2013.01); *H01M 6/085* (2013.01); *H01M 50/182* (2021.01); *H01M 50/56* (2021.01); *H01M 4/244* (2013.01); *H01M 4/50* (2013.01); *H01M 2300/0014* (2013.01)

(58) Field of Classification Search
None
See application file for complete search history.

(56) References Cited

U.S. PATENT DOCUMENTS 2,465,202 A * 3/1949 Craig ................... H01M 10/52
429/57
6,126,704 A   10/2000 Gardner
(Continued)

FOREIGN PATENT DOCUMENTS

EP    1118131 A1    7/2001
EP    1145342 A2   10/2001
(Continued)

OTHER PUBLICATIONS

JPS58123666A—machine translation (Year: 1983).*
(Continued)

*Primary Examiner* — Haroon S. Sheikh
(74) *Attorney, Agent, or Firm* — Alston & Bird LLP

(57) ABSTRACT

An electrochemical cell comprises a can comprising a cylindrical side wall extending from a closed end wall. The closed end wall comprises a protrusion. The protrusion has a protrusion cavity therein. A pre-formed pellet of a first electrode material is disposed in the protrusion cavity. The electrochemical cell may further comprise a separator defining an inner cavity and separating the inner cavity from an outer cavity. The outer cavity is defined by the can and the separator. The electrochemical cell may further comprise a first electrode material disposed in the outer cavity; and a second electrode material disposed in the inner cavity.

20 Claims, 5 Drawing Sheets

(51) Int. Cl.
*H01M 4/24* (2006.01)
*H01M 4/50* (2010.01)

(56) References Cited

U.S. PATENT DOCUMENTS

| | | | |
|---|---|---|---|
| 6,207,322 B1 * | 3/2001 | Kelsey | H01M 6/08 29/623.2 |
| 10,784,519 B2 | 9/2020 | Mark | |
| 2014/0057160 A1 | 2/2014 | Davis et al. | |

FOREIGN PATENT DOCUMENTS

| | | |
|---|---|---|
| JP | S58-123666 A | 7/1983 |
| JP | H06-28998 U | 4/1994 |

OTHER PUBLICATIONS

Japan Patent Office, Office Action received for Application No. 2020-568860, dated Oct. 13, 2021, 5 pages, Japan.
International Search Report and Written Opinion, dated Mar. 22, 2019, for PCT Application No. PCT/162019/050641, pp. 1-12.

* cited by examiner

ELECTROCHEMICAL CELL WITH ELECTRODE FILLED PROTRUSION

CROSS-REFERENCE TO RELATED APPLICATIONS

This application is a continuation of U.S. application Ser. No. 15/910,483, filed Mar. 2, 2018, the content of which is incorporated by reference herein in its entirety.

TECHNOLOGICAL FIELD

An example embodiment relates to an electrochemical cell having a protrusion, such as a pip protrusion. An example embodiment relates generally to alkaline batteries.

BACKGROUND

The discharge efficiency of a battery is important for maximizing the available output provided by a battery and extending the battery runtime. In particular, the discharge efficiency of an electrochemical cell describes what portion of the energy stored by the electrochemical cell is lost to internal resistance when discharging the battery. Thus, a higher discharge efficiency leads to more of the energy stored by the electrochemical cell being used to operate a consumer's device, for example. Therefore an electrochemical cell having a higher discharge efficiency wastes less of the energy stored therein due to internal resistance.

BRIEF SUMMARY OF SOME EXAMPLE EMBODIMENTS

Various example embodiments provide a battery having increased discharge efficiency. Various example embodiments provide a battery with increased first electrode material volume. In various example embodiments, the battery is a AA, AAA, C, D, LR6, LR03, LR14, LR20 and/or other battery size having a pip protrusion or other protrusion. In an example embodiment, the protrusion is at least partially filled with first electrode material. For example, the partial filling of the protrusion may increase the interfacial area between the first electrode material and the second electrode material. In an example embodiment, the electrochemical is an alkaline electrochemical cell.

In accordance with a first aspect of the disclosure, an electrochemical cell is provided. In an example embodiment, the electrochemical cell comprises a can comprising a cylindrical side wall extending from a closed end wall. The closed end wall comprises a protrusion, for example a pip protrusion, that defines a protrusion cavity therein. The electrochemical cell further comprises a separator defining an inner cavity and separating the inner cavity from an outer cavity. The outer cavity is defined by the can and the separator. The electrochemical cell further comprises a second electrode material disposed in the inner cavity; and a first electrode material disposed in the outer cavity and the protrusion cavity.

In accordance with another aspect of the disclosure, a method for manufacturing an electrochemical cell is provided. In an example embodiment, the method comprises providing a can comprising a cylindrical side wall extending from a closed end wall. The closed end wall comprises a protrusion with a protrusion cavity therein. The method further comprises placing first electrode material into the protrusion cavity; forming a first electrode ring of first electrode material and having a central void within the can; inserting a separator into the central void to define an inner cavity, the separator comprising a cylindrical separator wall and a bottom surface; placing second electrode material into the inner cavity, such that the second electrode material has interfacial area to the first electrode material along both the cylindrical separator wall and the bottom surface of the separator; and sealing a first end of the can opposite the second end.

In accordance with still another aspect of the disclosure, another method for manufacturing an electrochemical cell is provided. In an example embodiment, the method comprises providing a can comprising a cylindrical side wall extending from a closed end wall. The closed end wall comprises a protrusion having a protrusion cavity therein. The method further comprises inserting material comprising first electrode material into the can so as to at least partially fill the protrusion cavity; and tamping the material so as to pack the material into the protrusion cavity. The method further comprises forming a cathode ring within the can; inserting a separator into the cathode ring; placing second electrode material into an inner cavity defined by the separator; and sealing a first end of the can opposite the second end.

BRIEF DESCRIPTION OF THE DRAWINGS

Figure 1:
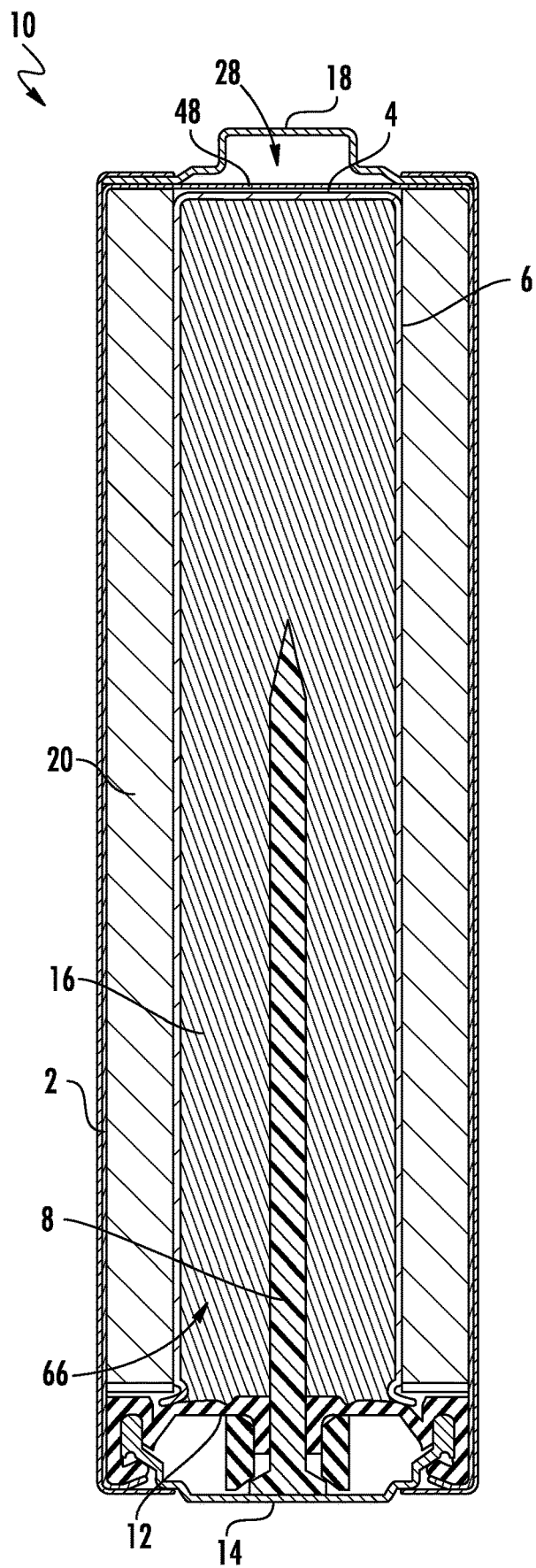
Figure 2:
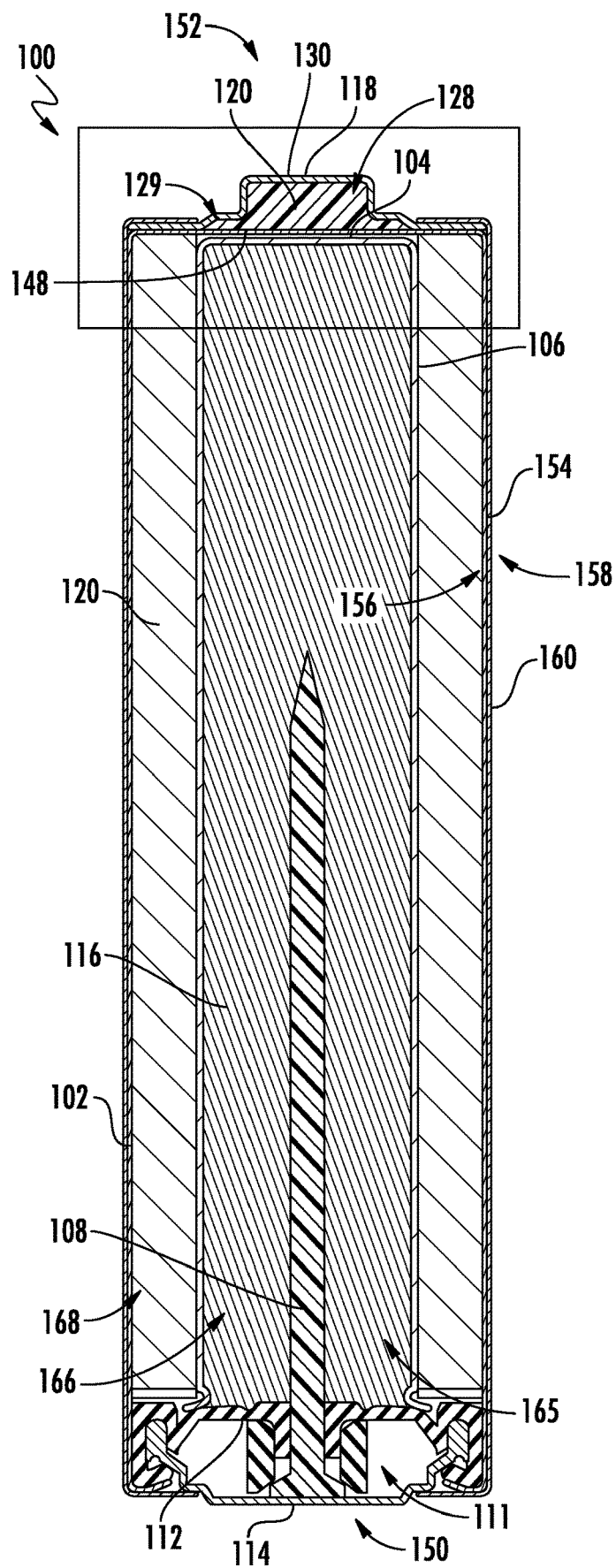
Figure 3:
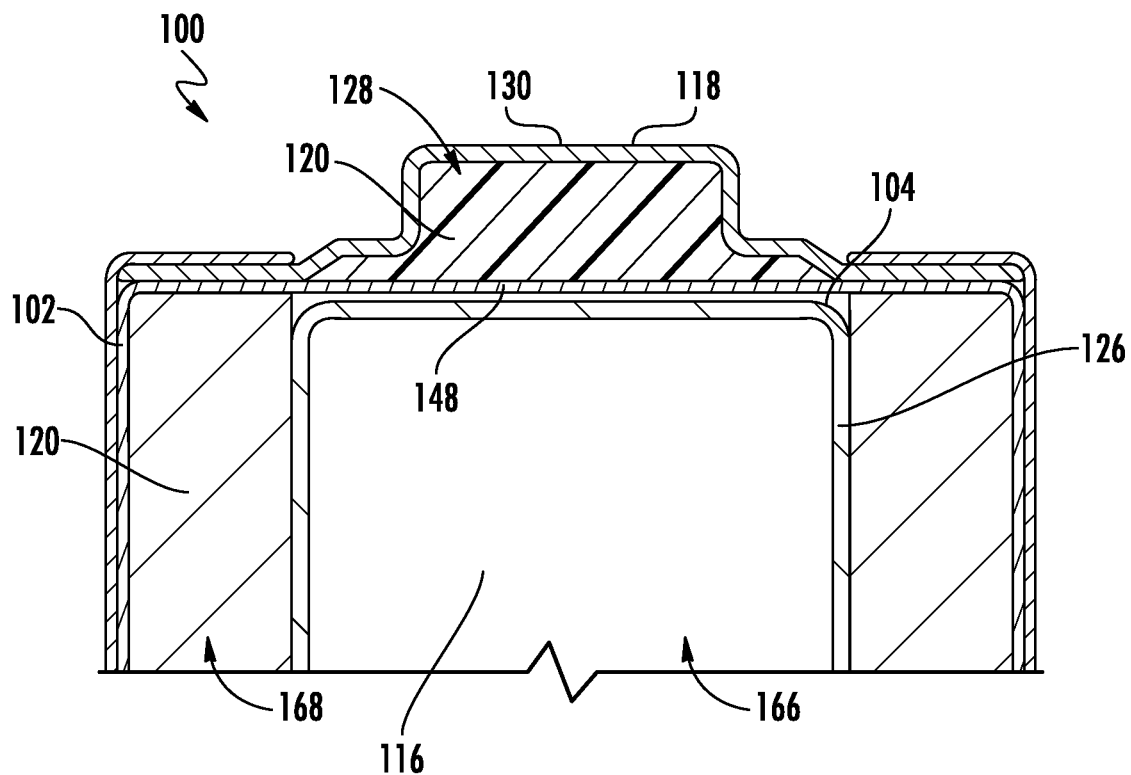
Figure 4:
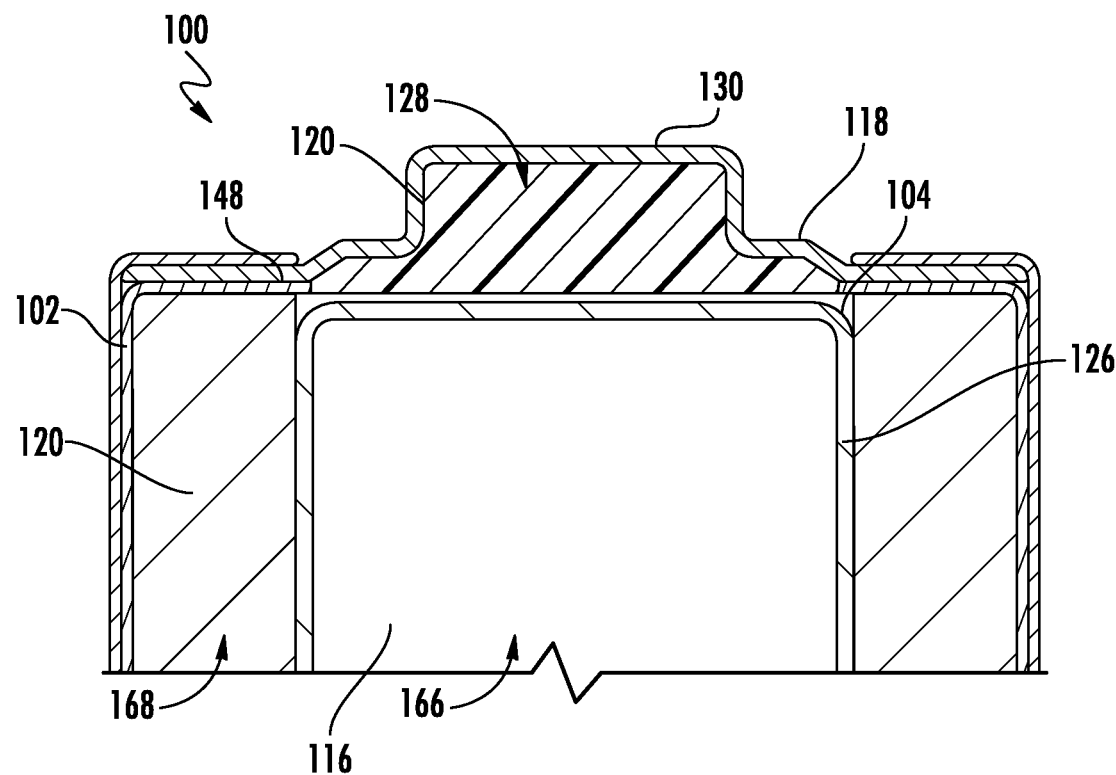
Figure 5:
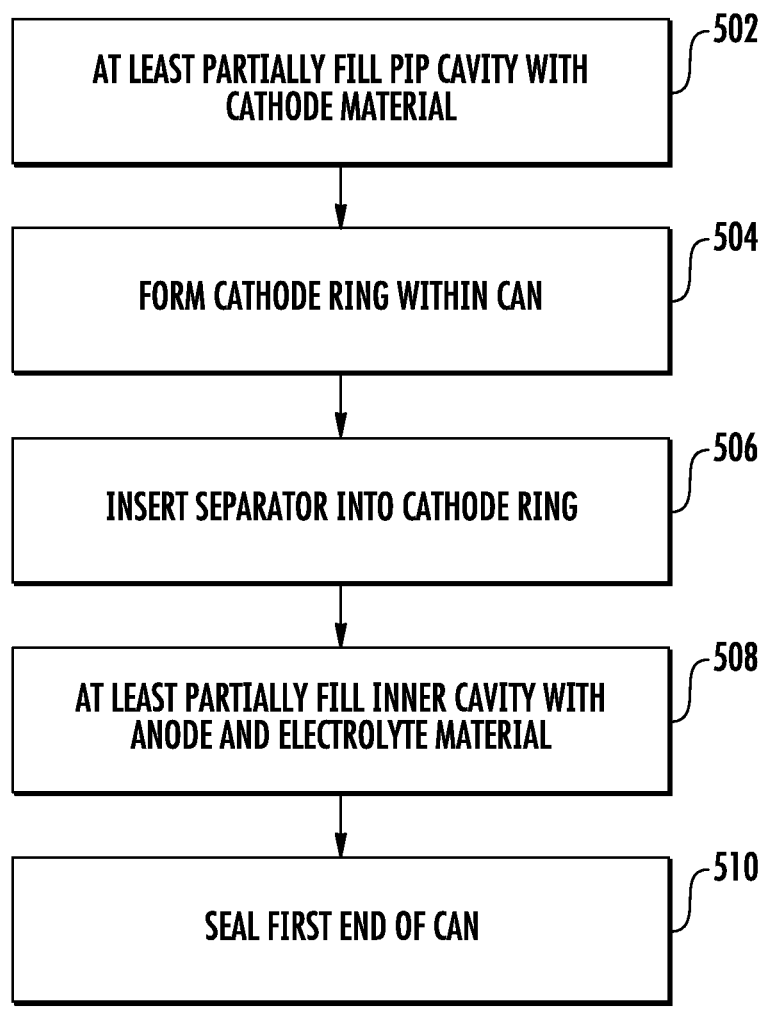

Having thus described certain example embodiments in general terms, reference will hereinafter be made to the accompanying drawings, which are not necessarily drawn to scale, and wherein:

FIG. 1 is a cross-sectional view of a related-art electrochemical cell;

FIG. 2 is a cross-sectional view of an example embodiment of a electrochemical cell according to an example embodiment;

FIG. 3 is a close-up cross-sectional view of the positive protrusion portion of the electrochemical cell show in FIG. 2;

FIG. 4 is a close-up cross-sectional view of the positive protrusion portion of another electrochemical cell according to an example embodiment; and FIG. 5 is a flowchart illustrating example processes and procedures for manufacturing an electrochemical cell according to an example embodiment.

DETAILED DESCRIPTION

Some embodiments will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "approximately," "generally," and similar terms are used to indicate that the corresponding item is within appropriate manufacturing and/or engineering tolerances.

FIG. 1 illustrates a battery 10. The battery 10 comprises a can 2 and a separator 6 comprising a bottom cup 4. Second electrode material 16 is disposed within an inner cavity 66 defined by the separator 6 and the bottom cup 4 and enclosed by a vented seal 12. A collector 8 extends into the second electrode material 16 and is in electrical connection with a negative cover 14. First electrode material 20 is disposed in an annular manner between the sidewalls of the can 2 and the separator 6. A positive cover 18 having a positive pip terminal is spot welded to the end of the can 2 opposite the negative cover 14. The positive pip terminal defines a protrusion cavity 28. The protrusion cavity 28 is generally filled with air. The can end wall 48 separates and/or isolates the protrusion cavity 28 from the bottom cup 4 of the separator 6 and the first electrode material 20. In some instances, the positive cover 18 having the positive pip terminal may be integrally formed with the can 2 such that there is not a can end wall 48 between the protrusion cavity and the bottom cup 4, but, in these instances the protrusion cavity 28 is still typically filled with air.

FIGS. 2, 3, and 4 illustrate a cylindrical electrochemical cell 100 (referred to as cell 100 herein). The cell 100 is an alkaline cell in various embodiments. For example, the cell 100 may be an AA, AAA, C, D, LR6, LR03, LR14, LR20, or other battery construction, comprising a protrusion 130. For example, in some embodiments, the protrusion 130 is a positive pip protrusion. For example, the cell 100 may be a bobbin-style electrochemical cell, according to one embodiment.

The cell 100 comprises a container generally shown as can 102. In an example embodiment, the can 102 is cylindrical. In an example embodiment, the can 102 is a steel can. In an example embodiment, the cell 100 is a AA-size electrochemical cell employing a low carbon, aluminum killed, SAE 1006 or equivalent steel with an inside can 102 plating of nickel and cobalt, and an outside plating of nickel. As should be understood, other embodiments of the cell 100 may have various dimensions as appropriate for the application and battery type.

In various embodiments, the can 102 comprises a first (or top) end 150, a second (or bottom) end 152, and a cylindrical side wall 154 extending between the first and second ends 150, 152. The second end 152 of the can 102 has a closed end wall 148. In an example embodiment, the closed end wall 148 may be integrally formed with the can 102 during formation of the can 102. This may be achieved by a conventional can 102 formation process, such as a deep drawing process. Alternately, the closed end wall 148 may be connected, e.g., welded, to the second end 152 of the cylindrical side wall 154 to form a can 102.

The can 102 and its closed end wall 148 may be made of any suitable metal or other electrically conductive material that can be formed into a desired shape and can be adapted to seal the contents within the cell 100 to allow the cell to function as described herein. In the embodiment shown in FIG. 2, the can 102 also functions as the cathode current collector, and is electrically conductive. In some embodiments, the internal surface 156 of the can 102 may be coated with a material, such as graphite, that may reduce the internal resistance between the internal surface 156 of the can 102 and the first electrode material 120. For example, in some embodiments, the internal surface 156 of the can 102 may be coated with a conductive material to efficiently electrically couple the can 102 to the first electrode material 120. The external surface 158 of the can 102 may be plated with a material to provide corrosion resistance, high electrical conductivity, and/or an attractive appearance. According to one embodiment, the internal surface 156 of the steel can 102 are plated with one or more metal(s) and heat-treated to improve these characteristics. According to one embodiment, the cylindrical side wall 154 and closed end wall 148 of the can 102 have a thickness in the range of about 0.005 inch to 0.014 inch (0.13 milliliters to 0.36 milliliters) thick. The can 102, cylindrical side wall 154 and closed end wall 148 may have the same or different thicknesses, coatings and/or platings.

Attached, such as by welding or the like, onto the exterior surface of the second end 152 of the can 102 is a positive contact terminal or cover 118. In an example embodiment, the positive contact terminal or cover 118 is formed of plated steel, such as a nickel plated steel, but may be formed of other electrically conductive materials. The first contact terminal or cover 118 has a protruding nubbin 130 (i.e., a pip protrusion or other protrusion) at its center region, which functions as the first contact terminal 118 of the cell 100. In an example embodiment, the first contact terminal or cover 118 is integrally formed with the can 102 and/or is an integral part of the can 102. For example, in an example embodiment, the closed end wall 148 of the can is also the first contact terminal or cover 118. For example, the first contact terminal or cover 118 may be integrally formed with the can 102 when the can 102 is manufactured or may be welded onto the can 102 as the closed end wall 148 of the can. For example, in an example embodiment, the protrusion cavity 128 defined by the protrusion 130 of the first contact terminal or cover 118 is not separated and/or isolated from the separator 106 and/or the first electrode material 120.

On the first end 150 of the can 102 is a second contact terminal or cover 114 which functions as the second contact terminal of the cell 100. The first and second contact terminals or covers 118, 114 are made of electrically conductive material, such as metal, metal alloys, conductive polymers or the like, and form the respective first and second electrical terminals. In an example embodiment, the first contact terminal 118 is the positive contact terminal and forms the positive electrical terminal of the electrochemical cell 100 and the second contact terminal 114 is the negative contact terminal and forms the negative electrical terminal of the electrochemical cell 100. In an example embodiment, the first contact terminal 118 is the negative contact terminal and forms the negative electrical terminal of the electrochemical cell 100 and the second contact terminal 114 is the positive contact terminal and forms the positive electrical terminal of the electrochemical cell 100.

A jacket 160 is formed about the exterior surface of the steel can 158, and is further formed over the peripheral edge of the closed second end 152 of the can 102. The jacket 160 may include a layer such as a metalized, plastic film label, which may serve as an insulator and/or brand identifier or the like.

A separator or basket 106 is disposed within the can 102 and defines an inner cavity 166 of the cell 100. An outer cavity 168 of the cell 100 is defined by the can 102 and the separator 106. In an example embodiment, the cross-section of separator 106 is U-shaped, such that the separator comprises a cylindrical separator wall 126 and a bottom surface 104. In an example embodiment, the cylindrical separator wall 126 and the bottom surface 104 define the inner cavity 166 of the cell 100.

The separator or basket 106 may be formed of a nonwoven fabric that prevents migration of solid particles of a predetermined size within the cell 100, and these terms (i.e., separator and basket) are used synonymously herein. Also, other separator materials may be used to form the separator 106, including but not limited to porous and microporous polymeric sheets, ceramics, woven materials or any other material or combination of materials that are compatible with the electrodes and electrolyte and that create an ionically permeable, physical barrier between the electrodes that allows the cell 100 to function as described herein.

Second electrode material 116 is also disposed within the can 102 inside of the separator 106. For example, the second electrode material 116 is disposed within the inner cavity 166 of the cell 100. In some embodiments, the second electrode material may be coated, adhered to or otherwise physically attached to another component, such as a separate current collector 108 and/or the separator 106 itself.

In some embodiments, one of the first electrode material 120 and the second electrode material 116 is cathode material. In some embodiments, the cathode material may be formed of a mixture of manganese dioxide ($MnO_2$), graphite, potassium hydroxide (KOH) solution, and additives, according to one embodiment. In some embodiments, other cathode materials may be used. In some embodiments, the other of the first electrode material 120 and the second electrode material 116 is anode and electrolyte material, also referred to as the negative electrode. In an example embodiment, the anode and electrolyte material comprises and/or is formed of zinc powder, a gelling agent, and additives. Other anode materials may be used, and the anode may be coated, adhered to or otherwise physically attached to another component, such as a separate current collector 108, the separator 106, and/or the can 102. In an example embodiment, the anode and electrolyte material comprises an alkaline electrolyte. For example, in an example embodiment, the first electrode material is cathode material and the second electrode material is anode and electrolyte material. In another example embodiment, the first electrode material is anode and electrolyte material and the second electrode material is cathode material.

A collector and seal assembly 111 is assembled onto the first or open end of the can 102 for closing the open end of the can 102. The collector and seal assembly shown includes a current collector 108, an annular polymeric (e.g., nylon) seal 112, and a second contact terminal or cover 114. The current collector 108, which may include a brass or other type of conductive nail/rod having an elongated body and enlarged head, is disposed in contact with the second electrode material 116 and second contact terminal or cover 114. For example, the current collector 108 has a head disposed at the first end 150 of the can 102 and an elongated body that extends at least part way along the length of the inner cavity 166. The second contact terminal or cover 114 extends across the open end of the can 102 and engages a seal 112 (e.g., a nylon or polymeric seal). The seal 112 may include a ring-shaped polymeric seal having a generally J-shape cross-section, according to one embodiment. The manufacturing of the seal 112 may include the seal 112 being positioned in the open end of the can 102 on top of a bead formed radially inward on the cylindrical side wall 154 of the can 102, or alternately in a flared opening of the can 102, and crimping the upper end of the can 102 inwardly and over the outer periphery of the seal 112 and second contact terminal or cover 114 to compress the seal 112 against the bead. The seal 112 is thereby compressed between the peripheral edge of the second contact terminal or cover 114 and the cylindrical side wall 154 of the can 102.

It should be appreciated that the second contact terminal or cover 114 is electrically insulated from the can 102 by way of the seal 112, which is made of an electrically insulating material. The resulting collector and seal assembly shown provides a low volume closure to the open end of the can 102. It should further be appreciated that other closure assemblies may be employed to seal closed the open first end 150 of the can 102.

Disposed within the can 102 is first electrode material 120. In accordance with the disclosure, first electrode material 120 may be disposed within the outer cavity 168 and within the protrusion cavity 128. In some embodiments, the first electrode material 120 may be coated, adhered to or otherwise physically attached to another component, such as a separate current collector, the separator 106 itself, and/or the can 102. As should be understood by a skilled practitioner, the separator 106 separates and/or isolates the first electrode material 120 from the second electrode material 116 such that the first electrode material 120 is maintained as physically separated from the second electrode material 116.

FIG. 5 provides a flowchart illustrating example processes and procedures that may be used to manufacture a cell 100 in accordance with example embodiments. Starting at block 502, the protrusion cavity 128 may be at least partially filled with first electrode material 120. In various embodiments, the first electrode material 120 may be inserted and/or disposed within the can 102 by at least partially filling the protrusion cavity 128 with first electrode material 120 and then forming a cathode ring comprising first electrode material 120 with the can 102. In an example embodiment, the cathode ring at least partially fills the region of the cell 100 that will form the outer cavity 168 upon insertion of the separator 106. For example, in an example embodiment, a pre-formed pellet comprising first electrode material 120 may be inserted into the protrusion cavity 128 to at least partially fill the protrusion cavity 128 with first electrode material 120. In an example embodiment, the pre-formed pellet may be cylindrical- or coin-shaped. In an example embodiment, the pre-formed pellet is shaped so as to fill the protrusion cavity 128. For example, the pre-formed pellet may have approximately the same dimensions as the protrusion cavity 128. For example, the pre-formed pellet may be shaped to match the internal contours of the protrusion cavity 128.

In various embodiments, first electrode material 120 may be used to at least partially fill the protrusion cavity 128 by filling the protrusion cavity 128 with a material comprising first electrode material 120. For example, the material may be a free flowing material (e.g., a powder, a granular material, and/or the like). The material may then be tamped using, for example, a rod that is shaped to the area at the base 129 of the protrusion cavity 128 to pack the material comprising the first electrode material 120 into the protrusion cavity 128.

At block 504, a cathode ring comprising first electrode material 120 is formed within the can 102. Once the protrusion cavity 128 is at least partially filled with first electrode material 120, the portion of the can 102 that will form the outer cavity 168 upon insertion of the separator 106 into the can is at least partially filled with first electrode material 120. For example, a cathode ring comprising first electrode material 120 may be formed in the can 102. For example, in an example embodiment, one or more pre-formed rings and/or a hollow cylinder comprising first electrode material may be inserted into the can 102. For example, the pre-formed rings and/or hollow cylinder may comprise a central opening, core, or void, 165 that is sized to receive the separator 106 therein. In an example embodiment, the pre-formed pellet and the pre-formed rings and/or hollow cylinder may be a single pre-formed insert comprising first electrode material 120. In an example embodiment, after the protrusion cavity 128 is at least partially filled with first electrode material 120, first electrode material 120 may be impact molded into a cylindrical ring against the internal surface 156 of the can 102. For example, the cylindrical ring may have a central opening sized to receive the separator 106 therein.

In various embodiments, the can 102 may initially be entirely filled with a material comprising first electrode material 120. For example, a free flowing material comprising first electrode material 120 may be used to fill the can 102. The material may then be impact molded by being compacted into the can so as to form a cathode-packed can. The first electrode material 120 may be impacted molded into the final ring shape with a central opening, core, or void 165 of the cathode-packed can 102 may be drilled out after molding so as to provide space for insertion of the separator 106 and second electrode material 116. For example, the packed first electrode material 120 may be removed from a central core of the cathode-packed can so as to form the cathode ring and provide space for insertion of the separator 106 into the can 102. For example, the central core may be sized to receive the separator 106 therein.

In various embodiments, once the protrusion cavity 128 and the region within the can 102 that will form the outer cavity 168 of the can 102 are at least partially filled with first electrode material 120, the separator 106 may be inserted into the cathode ring (e.g., the central core) at block 506. In an example embodiment, inserting the separator 106 into the cathode ring places an exterior surface of the cylindrical separator wall 126 and an exterior surface of the bottom surface 104 in contact with first electrode material 120. At block 508, the second electrode material may be inserted into the inner cavity 166 of the can 102. At block 510, the current collector 108 may be inserted into the inner cavity 166 and the first end 150 of the can 102 may be sealed using the seal 112 and second contact terminal or cover 114 to form the cell 100. For example, once the separator is inserted into the inner cavity 166, the cylindrical separator wall 126 and the bottom surface 104 are both in contact with first electrode material 120.

In various embodiments, the at least partial filling of the protrusion cavity 128 with first electrode material 120 increases the amount of first electrode material 120 within the cell 100 by approximately 2% with respect to the battery 10 (e.g., relative to a battery having an equal-sized first electrode material ring in the exterior cavity 168 but without a protrusion cavity 128 filled with first electrode material). In various embodiments, the amount of second electrode material 116 disposed within the inner cavity 166 may be increased with respect to the second electrode material 16 of the battery 10 so as to optimize the amount and/or ratio of second electrode material and first electrode material within the cell 100. In an example embodiment, the anode to electrolyte ratio of the first or second electrode material 120, 116, as appropriate, may be adjusted with respect to the anode to electrolyte ratio of the battery 10 so as to optimize the amount and/or ratio of the cathode material and anode material within the cell 100. For example, the amount of second material 116 within the cell 100 may be increased in comparison to the second electrode material 16 within the battery 10 (with a corresponding decrease in the amount of first electrode material within the first electrode material ring in the exterior cavity 168). In an example embodiment, the volume of the inner cavity 166 may be adjusted (with respect to the corresponding inner cavity 66 of the battery 10) to accommodate the increased second electrode material 116 therein. In an example embodiment, the anode to cathode ratio of the cell 100 may be in the range of 0.75 to 1.5. In an example embodiment, the anode to cathode ratio of the cell 100 may be in the range of 0.85-1.25. In an example embodiment, the anode to cathode ratio of the cell 100 may be in the range of 0.85-0.92. In an example embodiment, the anode to cathode ratio of the cell 100 may be in the range of 1.14-1.25.

The at least partial filling of the protrusion cavity 128 also increases the interfacial surface area between the anode and cathode of the cell 100 compared to the interfacial surface area between the anode and cathode of the battery 10. For example, the bottom surface 104 of the separator 106 has a surface area A. The interfacial surface area between the anode and cathode of the cell 100 is larger than the interfacial surface area between the anode and cathode of the battery 10 by the surface area A. The increase in interfacial surface area between the anode and the cathode of cell 100 is capable of providing increased efficiency in discharge of the cell 100 compared to the battery 10.

Many modifications and other embodiments of the embodiments set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An electrochemical cell comprising:
a can comprising a cylindrical side wall extending from a first end of the can to a second end of the can, the second end of the can having a contact cover welded thereto, the contact cover enclosing an opening of the second end of the can to form a closed end wall, the contact cover comprising a protrusion with a protrusion cavity therein; and
a pre-formed pellet of a first electrode material disposed in the protrusion cavity, wherein the pre-formed pellet is sized and shaped to contour to the protrusion cavity.

2. The electrochemical cell of claim 1, wherein the construction is one of an LR6, LR03, LR14, or LR20 electrochemical cell.

3. The electrochemical cell of claim 1, wherein an interfacial area between the first electrode material and a second electrode material disposed within the can comprises surface area of both a separator wall of a separator and a bottom surface of the separator.

4. The electrochemical cell of claim 1, wherein an anode to cathode ratio of the electrochemical cell is in the range of 0.75 to 1.5.

5. The electrochemical cell of claim 1, further comprising a second electrode material, wherein one of the first electrode material or the second electrode material comprises an alkaline electrolyte.

6. The electrochemical cell of claim 1, wherein the pre-formed pellet is secured to a pre-formed hollow cylinder comprising first electrode material, the pre-formed hollow cylinder sized to be inserted into the can.

7. The electrochemical cell of claim 1, further comprising an impact molded cylindrical ring of first electrode material against an internal surface of the cylindrical side wall.

8. The electrochemical cell of claim 1, wherein the pre-formed pellet is part of a pre-formed electrode structure comprising the pre-formed pellet and a pre-formed hollow cylinder of the first electrode material.

9. The electrochemical cell of claim 8, wherein the pre-formed hollow cylinder comprises a central opening configured to receive a separator therein.

10. The electrochemical cell of claim 1, wherein pre-formed pellet amounts to 2% of the first cathode material within the electrochemical cell.

11. A method for manufacturing an electrochemical cell, the method comprising:
   providing a can comprising a cylindrical side wall extending from a first end of the can to a second end of the can, the second end of the can having a contact cover welded thereto, the contact cover enclosing an opening of the second send of the can to form a closed end wall, the contact cover comprising a protrusion with a protrusion cavity therein;
   inserting a pre-formed pellet of a first electrode material into the protrusion cavity, wherein the pre-formed pellet is sized and shaped to contour to the protrusion cavity; and
   sealing a first end of the can opposite the closed end wall.

12. The method of claim 11, wherein the pre-formed pellet is secured to a pre-formed hollow cylinder comprising first electrode material, the pre-formed hollow cylinder sized to be inserted into the can.

13. The method of claim 11, further comprising impact molding a cylindrical ring of first electrode material against an internal surface of the cylindrical side wall.

14. The method of claim 11, further comprising inserting a separator into the can, wherein inserting the separator into the can causes both a bottom surface of the separator and a separator wall to be in contact with the first electrode material.

15. The method of claim 14, further comprising inserting second electrode material into an interior of the separator.

16. A method for manufacturing a electrochemical cell, the method comprising:
   providing a can comprising a cylindrical side wall extending from a first end of the can to a second end of the can, the second end of the can having a contact cover welded thereto, the contact cover enclosing an opening of the second send of the can to form a closed end wall, the contact cover comprising a protrusion with a protrusion cavity therein;
   inserting a pre-formed pellet comprising cathode material into the can so as to at least partially fill the protrusion cavity, wherein the pre-formed pellet is sized and shaped to contour to the protrusion cavity; and
   sealing a first end of the can opposite the closed end wall.

17. The method of claim 16, further comprising impact molding a cylindrical ring of cathode material against an internal surface of the cylindrical side wall.

18. The method of claim 16, further comprising forming a cathode ring within the can, wherein forming the cathode ring comprises inserting a material comprising the cathode material into the can and tamping the material so as to pack the material into the can so as to at least partially fill the can with packed material.

19. The method of claim 18, further comprising removing a central core of the packed material from the can, wherein a separator is inserted into the central core.

20. The method of claim 16, further comprising inserting a separator into the can, wherein inserting the separator into the can causes both a bottom surface of the separator and a separator wall to be in contact with the first electrode material.

* * * * *